United States Patent
Gruenstein et al.

(10) Patent No.: US 10,699,710 B2
(45) Date of Patent: **\*Jun. 30, 2020**

(54) DETECTING AND SUPPRESSING VOICE QUERIES

(71) Applicant: Google LLC, Mountain View, CA (US)

(72) Inventors: Alexander H. Gruenstein, Mountain View, CA (US); Aleksandar Kacun, New York, NY (US); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/198,084

(22) Filed: Nov. 21, 2018

(65) Prior Publication Data

US 2019/0156828 A1 May 23, 2019

Related U.S. Application Data

(63) Continuation of application No. 15/593,278, filed on May 11, 2017, now Pat. No. 10,170,112.

(51) Int. Cl.
| | | |
|---|---|---|
| *G10L 15/22* | (2006.01) | |
| *G10L 15/08* | (2006.01) | |
| *G10L 17/00* | (2013.01) | |
| *G10L 15/26* | (2006.01) | |
| *H04L 29/06* | (2006.01) | |
| *G10L 15/06* | (2013.01) | |
| *G06F 16/432* | (2019.01) | |

(52) U.S. Cl.
CPC .............. *G10L 15/22* (2013.01); *G10L 15/08* (2013.01); *G10L 15/26* (2013.01); *G10L 17/005* (2013.01); *H04L 63/1425* (2013.01); *H04L 63/1458* (2013.01); *G06F 16/433* (2019.01); *G10L 2015/0636* (2013.01); *G10L 2015/088* (2013.01); *G10L 2015/223* (2013.01)

(58) Field of Classification Search
CPC ... G10L 15/08; G10L 15/22; G10L 2015/233; G10L 2015/265; G10L 2015/0631; G10L 2015/0636; G06F 16/433; H04L 63/1425; H04L 63/1458
USPC .......................... 707/706; 704/251, 270, 275
See application file for complete search history.

(56) References Cited

U.S. PATENT DOCUMENTS

| | | | |
|---|---|---|---|
| 8,670,537 B2 * | 3/2014 | Metzger .................. | H04M 3/56 370/260 |
| 10,170,112 B2 * | 1/2019 | Gruenstein ......... | H04L 63/1458 |

(Continued)

*Primary Examiner* — James S Wozniak
(74) *Attorney, Agent, or Firm* — Honigman LLP; Brett A. Krueger

(57) ABSTRACT

A computing system receives requests from client devices to process voice queries that have been detected in local environments of the client devices. The system identifies that a value that is based on a number of requests to process voice queries received by the system during a specified time interval satisfies one or more criteria. In response, the system triggers analysis of at least some of the requests received during the specified time interval to trigger analysis of at least some received requests to determine a set of requests that each identify a common voice query. The system can generate an electronic fingerprint that indicates a distinctive model of the common voice query. The fingerprint can then be used to detect an illegitimate voice query identified in a request from a client device at a later time.

24 Claims, 8 Drawing Sheets

(56) References Cited

U.S. PATENT DOCUMENTS

| | | | | |
|---|---|---|---|---|
| 2004/0111632 | A1* | 6/2004 | Halperin | G06F 21/552 726/24 |
| 2004/0220915 | A1* | 11/2004 | Kline | G06F 16/951 |
| 2006/0036727 | A1* | 2/2006 | Kurapati | H04L 63/1458 709/224 |
| 2006/0075084 | A1* | 4/2006 | Lyon | H04L 29/06027 709/223 |
| 2007/0076853 | A1* | 4/2007 | Kurapati | H04L 29/06027 379/1.01 |
| 2008/0080552 | A1* | 4/2008 | Gates | H04L 12/66 370/468 |
| 2008/0222724 | A1* | 9/2008 | Ormazabal | H04L 63/1458 726/23 |
| 2009/0265317 | A1* | 10/2009 | Buehrer | H04L 47/10 |
| 2010/0050255 | A1* | 2/2010 | Upadhyay | H04L 63/1458 726/22 |
| 2010/0138377 | A1* | 6/2010 | Wright | G06K 9/6284 706/52 |
| 2010/0235910 | A1* | 9/2010 | Ku | G06F 21/55 726/22 |
| 2011/0283360 | A1* | 11/2011 | Abadi | H04L 63/1416 726/24 |
| 2013/0019202 | A1* | 1/2013 | Regan | G06F 16/9535 715/810 |
| 2013/0104230 | A1* | 4/2013 | Tang | G06F 21/552 726/23 |
| 2013/0263226 | A1* | 10/2013 | Sudia | H04L 63/1466 726/4 |
| 2014/0199664 | A1* | 7/2014 | Sadeh-Koniecpol | G09B 5/00 434/118 |
| 2015/0052115 | A1* | 2/2015 | Sharifi | G06Q 30/0631 707/722 |
| 2016/0021105 | A1* | 1/2016 | Pellom | G06F 16/3331 726/7 |
| 2016/0241579 | A1* | 8/2016 | Roosenraad | G06F 16/9535 |
| 2016/0344765 | A1* | 11/2016 | Shiell | H04L 63/1458 |
| 2016/0373909 | A1* | 12/2016 | Rasmussen | H04L 41/0681 |
| 2017/0024657 | A1* | 1/2017 | Sahu | G06F 16/951 |
| 2017/0078324 | A1* | 3/2017 | Bordawekar | H04L 63/1458 |
| 2017/0134577 | A1* | 5/2017 | Wold | G10L 17/00 |

* cited by examiner

DETECTING AND SUPPRESSING VOICE QUERIES

TECHNICAL FIELD

This specification generally relates to computer-based systems and techniques for recognizing spoken words, otherwise referred to as speech recognition

BACKGROUND

Voice-based client devices can be placed in a home, office, or other environment and can transform the environment into a speech-enabled environment. In a speech enabled-environment, a user can speak a query or command to prompt the voice-based client to generate an answer or to perform another operation in accordance with the user's query or command. In order to prevent a voice-based client from picking up all utterances made in a speech-enabled environment, the client may be configured to activate only when a pre-defined hotword is detected in the environment. A hotword, which is also referred to as an "attention word" or "voice action initiation command," is generally a predetermined word or term that is spoken to invoke the attention of a system. When the system detects that the user has spoken a hotword, the system can enter a ready state for receiving further voice queries.

SUMMARY

This document describes systems, methods, devices, and other techniques for detecting illegitimate voice queries uttered in the environment of a client device and for suppressing operations indicated by such illegitimate voice queries. In some implementations, voice-based clients may communicate over a network with a voice query processing server system to obtain responses to voice queries detected by the clients. Although many voice queries received at the server system may be for legitimate ends (e.g., to request an answer to an individual person's question or to invoke performance of a one-time transaction), not all voice queries may be benign. Some voice queries may be used by malicious actors, for example, to carry out a distributed denial of service (DDoS) attack. Other queries may arise from media content rather than human users, such as dialog in a video that includes a hotword. When the video is played back, whether intentionally or unintentionally, the hotword may activate a voice-based client into a state in which other dialog in the video is inadvertently captured as a voice query and requested to be processed. In some implementations, the techniques disclosed herein can be used to detect illegitimate voice queries by clustering the same or similar queries received at a server system from multiple client devices over a period of time. If a group of common voice queries satisfies one or more suppression criteria, the system may blacklist the voice query so as to suppress performance of operations indicated by other, matching voice queries that the system subsequently receives. In some implementations, the system may identify a spike in traffic at the system as a signal to search for potentially illegitimate voice queries that may attempt to exploit the system.

Some implementations of the subject matter disclosed herein include a computer-implemented method. The method may be performed by a system of one or more computers in one or more locations. The system receives, from a set of client devices, requests to process voice queries that have been detected in local environments of the client devices. The system can then identify that a value that is based on a number of requests to process voice queries received by the system during a specified time interval satisfies one or more first criteria. In response to identifying that the value that is based on the number of requests to process voice queries received by the system during the specified time interval satisfies the one or more first criteria, the system can analyze at least some of the requests received during the specified time interval to determine a set of requests that each identify a common voice query. The system may generate an electronic fingerprint that represents a distinctive model of the common voice query. Then, using the electronic fingerprint of the common voice query, the system may identify an illegitimate voice query in a request received from a client device at a later time. In some implementations, the system suppresses performance of operations indicated by the common voice query in one or more requests subsequently received by the system.

These and other implementations can optionally include one or more of the following features.

The system can determine whether the set of requests that each identify the common voice query satisfies one or more second criteria. The system can select to generate the electronic fingerprint of the common voice query based on whether the set of requests that each identify the common voice query is determined to satisfy the one or more second criteria.

Determining whether the set of requests that each identify the common voice query satisfies the one or more second criteria can include determining whether a value that is based on a number of requests in the set of requests that each identify the common voice query satisfies a threshold value.

Identifying that the value that is based on the number of requests to process voice queries received by the system during the specified time interval satisfies the one or more first criteria can include determining that a volume of requests received by the system during the specified time interval satisfies a threshold volume.

The volume of requests received by the system during the specified time interval can indicate at least one of an absolute number of requests received during the specified time interval, a relative number of requests received during the specified time interval, a rate of requests received during the specified time interval, or an acceleration of received requests received during the specified time interval.

Analyzing at least some of the requests received during the specified time interval to determine the set of requests that each identify the common voice query can include generating electronic fingerprints of voice queries identified by requests received during the specified time interval and determining matches among the electronic fingerprints.

The common voice query can include a hotword that is to activate client devices and one or more words that follow the hotword. In some implementations, the common voice query does not include the hotword.

Some implementations of the subject matter disclosed herein include another computer-implemented method. The method can be performed by a system of one or more computers in one or more locations. The system receives, from a set of client devices, requests to process voice queries that have been detected in local environments of the client devices. For each request in at least a subset of the requests, the system can generate an electronic fingerprint of a respective voice query identified by the request. The system can compare the electronic fingerprints of the respective voice queries of requests in the at least the subset of the requests to determine groups of matching electronic fingerprints. The system determines, for each group in at least a subset of the groups of matching electronic fingerprints, a respective count that indicates a number of matching electronic fingerprints in the group. One or more of the groups of matching electronic fingerprints can be selected by the system based on the counts. For each selected group of matching electronic fingerprints, a respective electronic fingerprint that is based on one or more of the matching electronic fingerprints in the group can be registered with a voice query suppression service.

These and other implementations can optionally include one or more of the following features.

For each request in the at least the subset of the requests, the system can generate the electronic fingerprint of the respective voice query identified by the request by generating a model that distinctively characterizes at least audio data for the respective voice query. In some instances, the model further identifies a textual transcription for the respective voice query.

For each selected group of matching electronic fingerprints, the system can register the respective electronic fingerprint for the group with the voice query suppression service by adding the respective electronic fingerprint to a database of blacklisted voice queries.

The system can perform further operations that include receiving, as having been sent from a first client device of the set of client devices, a first request to process a first voice query detected in a local environment of the first client device; generating a first electronic fingerprint of the first voice query; comparing the first electronic fingerprint to electronic fingerprints of a set of blacklisted voice queries; determining whether the first electronic fingerprint matches any of the electronic fingerprints of the set of blacklisted voice queries; and in response to determining that the first electronic fingerprint of the first voice query matches at least one of the electronic fingerprints of the set of blacklisted voice queries, determining to suppress an operation indicated by the first voice query.

The system can select the one or more of the groups of matching electronic fingerprints based on the one or more of the groups having counts that indicate greater numbers of matching electronic fingerprints than other ones of the groups of matching electronic fingerprints.

The system can select the one or more of the groups of matching electronic fingerprints based on the one or more of the groups having counts that satisfy a threshold count.

The system can further perform operations including sampling particular ones of the received requests to generate the subset of the requests, wherein the system generates an electronic fingerprint for each voice query identified by requests in the subset of the requests rather than for voice queries identified by requests not within the subset of the requests. In some implementations, sampling particular ones of the received requests to generate the subset of the requests can include at least one of randomly selecting requests for inclusion in the subset of the requests or selecting requests for inclusion in the subset of the requests based on one or more characteristics of client devices that submitted the requests.

The system can further perform operations that include, for a first group of the selected groups of matching electronic fingerprints, generating a representative electronic fingerprint for the first group based on multiple electronic fingerprints from the first group of matching electronic fingerprints; and registering the representative electronic fingerprint with the voice query suppression service.

Additional innovative aspects of the subject matter disclosed herein include one or more computer-readable media having instructions stored thereon that, when executed by one or more processors, cause the processors to perform operations of the computer-implemented methods disclosed herein. In some implementations, the computer-readable media may be part of a computing system that includes the one or more processors and other components.

Some implementations of the subject matter described herein may, in certain instances, realize one or more of the following advantages. The system may block operations indicated in voice queries that risk comprising user accounts or consuming computational resources of client devices and/or a server system. In some implementations, the system can identify illegitimate voice queries without human intervention and even if the voice queries do not contain predefined markers of illegitimate voice queries. For example, the system may determine that a common set of voice queries issued by devices within a particular geographic area are illegitimate based on a statistical inference that the same voice query would not be independently repeated by users above a threshold volume or frequency within a specified time interval. Accordingly, the system may classify such a commonly occurring voice query as illegitimate and permanently or temporarily blacklist the query for all or some users of the system. Additional features and advantages will be recognized by those of skill in the art based on the following description, the claims, and the figures.

DESCRIPTION OF DRAWINGS

Like numbers and references among the drawings indicate like elements.

DETAILED DESCRIPTION

This document describes computer-based systems, methods, devices, and other techniques for detecting and suppressing illegitimate voice queries. In general, an illegitimate voice query is a voice query that is not issued under conditions that a voice query processing system deems acceptable such that the voice query can be safely processed. For example, some illegitimate voice queries may be issued by malicious actors in an attempt to exploit a voice query processing system, e.g., to invoke a fraudulent transaction or to invoke performance of operations that risk consuming an unwarranted amount of computational resources of the system. In some implementations, the techniques disclosed herein may be applied to detect and suppress a large-scale event in which voice queries are issued to many (e.g., tens, hundreds, or thousands) voice-based clients simultaneously or within a short timeframe in an attempt to overload the backend servers of a voice query processing system. The system may monitor characteristics of incoming voice query processing requests across a population of client devices to identify potential threats and suppress processing of illegitimate voice queries. The details of these and additional techniques are described with respect to the figures.

Figure 1A:
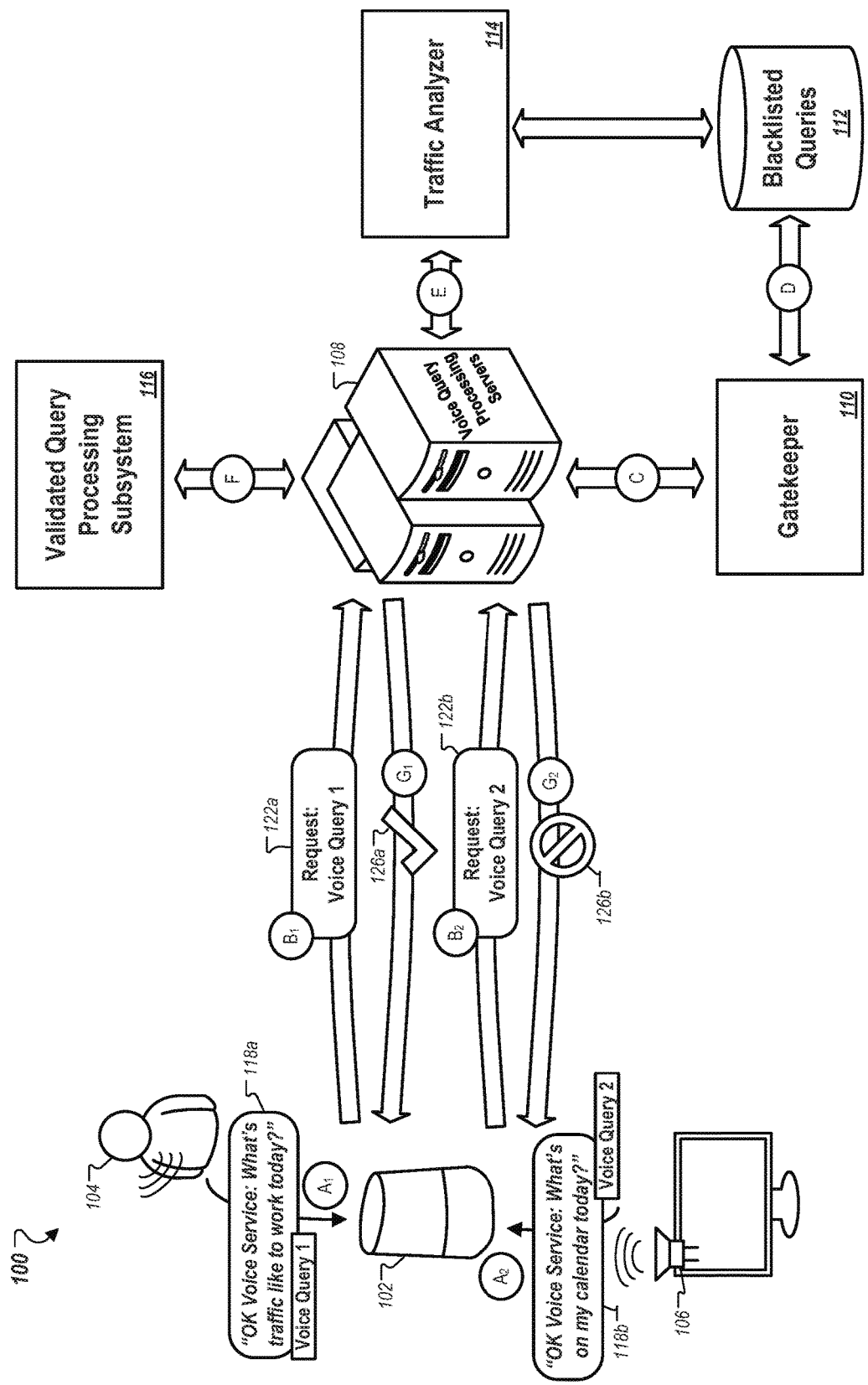
FIG. 1A depicts a conceptual diagram of an example process for responding to a first voice query and suppressing a second voice query received at a client device.

FIG. 1A is a conceptual diagram of an example process 100 for responding to a first voice query 118a and suppressing a second voice query 118b. For example, the first voice query 118a may be a legitimate query that a voice query processing system 108 is configured to respond to in a manner expected by a user 104, while the second voice query 118b may be an illegitimate voice query has been blacklisted so as to prevent the voice query processing system 108 from acting on the query in a requested manner.

As illustrated in FIG. 1A, at stages $A_1$ and $A_2$, respectively, a voice query client device 102 receives the first voice query 118a and the second voice query 118b. The client device 102 may be any suitable device that can receive voice queries and interact with a remotely located voice query processing system 108 to process the received voice queries and determine how to respond to such queries. For example, the client device 102 may be a smart appliance, a mobile device (e.g., a smartphone, a tablet computer, a notebook computer), a desktop computer, or a wearable computing device (e.g., a smartwatch or virtual reality visor).

In some implementations, the client device 102 is a voice-based client that primarily relies on speech interactions to receive user inputs and present information to users. For instance, the device 102 may include one or more microphones and a hotworder that is configured to constantly listen for pre-defined hotwords spoken in proximity of the device 102 (e.g., in a local environment of the device 102). The device 102 may be configured to activate upon detecting ambient audio that contains a pre-defined hotword. For example, as shown in FIG. 1A, the phrase "OK Voice Service" is a hotword that activates the device 102 in a mode that enables it to receive voice queries. In some implementations, a voice-based client device 102 can facilitate a substantially hands-free experience for a user so that the user can provide queries and obtain responses without needing to physically interact with the device 102 with his or her hands.

A voice query is generally a string of one or more words that are spoken to prompt a computing system to perform one or more operations indicated by the words. As an example, the first voice query 118a includes the phrase "What's traffic like to work today?" The first voice query 118a is thus spoken in a natural and conversation manner that the voice query processing system 108 is capable of parsing to determine a meaning of the query and a response to the query. Similarly, the second voice query 118b includes the phrase "What's on my calendar today?", which is spoken to prompt the client device 102 and/or the voice query processing system 108 to identify events on a user's calendar and to present a response to the user. Some voice queries may include a carrier phrase as a prefix that indicates a particular operation or command to be performed, followed by one or more words that indicate parameters of the operation or command indicated by the carrier phrase. For example, in the query "Call Teresa's school," the word "Call" is a carrier term that is to prompt performance of a telephone dialing operation, while the words "Teresa's school" comprise a value of a parameter indicating the entity that is to be dialed in response to the voice query. The carrier phrase may be the same or different from a hotword for activating a device 102. For example, a user 104 may first speak the "OK Voice Service" hotword to activate the device 102 and then speak the query "Call Teresa's school" to prompt a dialing operation.

Noticeably, in the example of FIG. 1A, the first voice query 118a is uttered by a human user 104, while the second voice query 118b is a recording or synthesized speech played by speaker(s) of an audio device 106. The audio device 106 may be any audio source that generates voice queries in audible range of the client device 102, e.g., in the same room or other local environment of the client device 102. For example, the audio device 106 may be a television, a multimedia center, a radio, a mobile computing device, a desktop computer, a wearable computing device, or other types of devices that include one or more speakers to playback a voice query.

In some instances, an audio device 106 may be caused to play an illegitimate voice query. For instance, an attacker may attempt to overload the voice query processing subsystem 108 by broadcasting the second voice query 118b to many audio devices 106 in separate locations, so as to cause many instances of the second voice query 118b to be played in close temporal proximity to each other. Client devices 102 located near the audio devices 106 may detect respective instances of the second voice query 118b and request the voice query processing system 108 to process the second voice query 118b at substantially the same or similar times. Such a distributed attack may occur by leveraging playback of viral online videos or broadcasting video content (e.g., television shows or commercials) that includes a voice query having the pre-defined activation hotword for playback on audio devices 106 in various environments in proximity of client devices 102. As discussed with respect to stages $B_1$ through $G_2$, the system 108 may determine that the first voice query 118a is legitimate and provide a response to the first voice query 118a based on performance of an operation indicated by the voice query 118a. In contrast, the system 108 may determine that the second voice query 118b is illegitimate and therefore selects to suppress performance of the operation indicated by the second voice query 118b.

For each voice query received by the client device 102, the device 102 may generate and transmit a request to the voice query processing system 108 requesting the system 108 to process the received voice query. A request can be, for example, a hypertext transfer protocol (HTTP) message that includes header information and other information that identifies the voice query that is to be processed. In some implementations, the other information that identifies the voice query can be audio data for the voice query itself such that data representing the voice query is embedded within the request. In other implementations, the information that identifies the voice query in a request may be an address or other pointer indicating a network location at which a copy of the voice query can be accessed. The voice query processing system 108 and the client device 102 can be remotely located from each other and can communicate over one or more networks (e.g., the Internet). The client device 102 may transmit voice query processing requests 118a, 118b over a network to the voice query processing system 108, and in response, the voice query processing system 108 may transmit responses 126a, 126b to the requests 118a, 11b over the network to client device 102.

The audio data representing a voice query indicated in a request may include audio data for the content of the query (e.g., "What's traffic like to work today?" or "What's on my calendar today?"), and optionally may include audio data for an activation hotword that precedes the content of the query (e.g., "OK Voice Service"). In some instances, the audio data may further include a representation of audio that precedes or follows the voice query for a short duration to provide additional acoustic context to the query. The client device 102 may use various techniques to capture a voice query.

In some implementations, the device 102 may record audio for a fixed length of time following detection of an activation hotword (e.g., 2-5 seconds). In some implementations, the device 102 may use even more sophisticated endpointing techniques to predict when a user has finished uttering a voice query.

At stage B1, the client device 102 transmits a first request 122a to the voice query processing system 108. At stage B2, the client device 102 transmits a second request 122b to the voice query processing system 108. The requests 122a, 122b include, or otherwise identify, audio data for the first voice query 118a and the second voice query 118b, respectively. Although the operations associated with processing voice queries 118a and 118b are described here in parallel by way of example, in practice the voice queries 118a and 118b may be detected at different times and processed independently of each other in a serial manner.

In some implementations, upon receiving a request from the client device 102, the voice query processing system 108 screens the request to determine whether the voice query identified by the request is legitimate. If a voice query is legitimate (e.g., benign), the system 108 may process the voice query in an expected manner by performing an operation indicated by the query. However, if a voice query is deemed illegitimate, the system 108 may suppress performance of one or more operations indicated by the query.

For example, upon receiving the first voice query processing request 122a, the system 108 may provide the request 122a to a gatekeeper 110 (stage C) that implements a voice query suppression service. The gatekeeper 110 generates an electronic fingerprint that distinctively models the first voice query 118a identified by the request 122a. The fingerprint may represent acoustic features derived from audio data of the first voice query 118a and, optionally, may include a textual transcription of the first voice query 118a. The gatekeeper 110 may then compare the fingerprint for the first voice query 118a to fingerprints stored in the database 112 (stage D), which are fingerprints of voice queries that have been blacklisted by the system 108.

In the example of FIG. 1A, no match is identified between the electronic fingerprint for the first voice query 118a and fingerprints in the blacklisted voice queries database 112. Accordingly, the first voice query 118a is validated as a legitimate query and is provided to a validated query processing subsystem 116 for further processing. The validated query processing subsystem 116 may transcribe and parse the first voice query 118a to determine a requested operation, and may at least partially perform the requested operation (e.g., gather data about traffic conditions on a route to work for the user 104). In contrast, the second voice query 118b is also screened by the gatekeeper 110 and is determined to be an illegitimate voice query having a fingerprint that matches a fingerprint in the database of blacklisted queries 112. As a result, the voice query processing system 108 suppresses complete performance of the operation indicated by the second voice query 118b. For example, the system 108 may not provide the voice query 118b to the validated query processing subsystem 116 in response to determining that the voice query 118b is not a legitimate query.

At stage G1, the voice query processing system 108 returns a response 126a to the client device's first request 122a. The response 126a may be, for example, text or other data that the client device 102 can process with a speech synthesizer to generate an audible response to the user's question about current traffic conditions on route to work. In some implementations, the voice query processing system 108 includes a speech synthesizer that generates an audio file which is transmitted to the client device 102 for playback as a response to the first query 118a. However, because the second query 118b was determined to be illegitimate, the system 108 does not transmit a substantive response to the question about the current day's calendar events, as indicated by the second voice query 118b. Instead, the system 108 may transmit an indication 126b that processing of the second voice query 118b was suppressed (e.g., blocked) or otherwise could not be performed. In other implementations, the voice query processing system 108 may not send any message to the client device 102 in response to a request that has been blocked for identifying an illegitimate voice query. The client device 102 may instead, for example, timeout waiting for a response from the system 108. Upon timing out, the device 102 may re-enter a state in which it prepares to receive another voice query by listening for an occurrence of the activation hotword in the local environment.

In some implementations, the voice query processing system 108 further includes a traffic analyzer 114. The traffic analyzer 114 monitors characteristics of requests received by the system over time from a range of client devices 102 that the system 108 services. In general, the traffic analyzer 114 can identify trends in network traffic received from multiple client devices 102 to automatically identify illegitimate voice queries. The traffic analyzer 114 may, for instance, determine a volume of requests received over a given time interval for a common voice query. If certain criteria are met, such as a spike in the level of system traffic, an increase in the number of requests received to process a common voice query over time, or a combination of these and other criteria, the traffic analyzer 114 may classify a voice query as illegitimate and add a fingerprint of the query to the database 112. As such, so long as the fingerprint for the query is registered in the database 112, the gatekeeper 110 may suppress voice queries that correspond to the blacklisted query. Additional detail about the traffic analyzer 114 is described with respect to FIGS. 2B, 3 and 4.

Figure 1B:
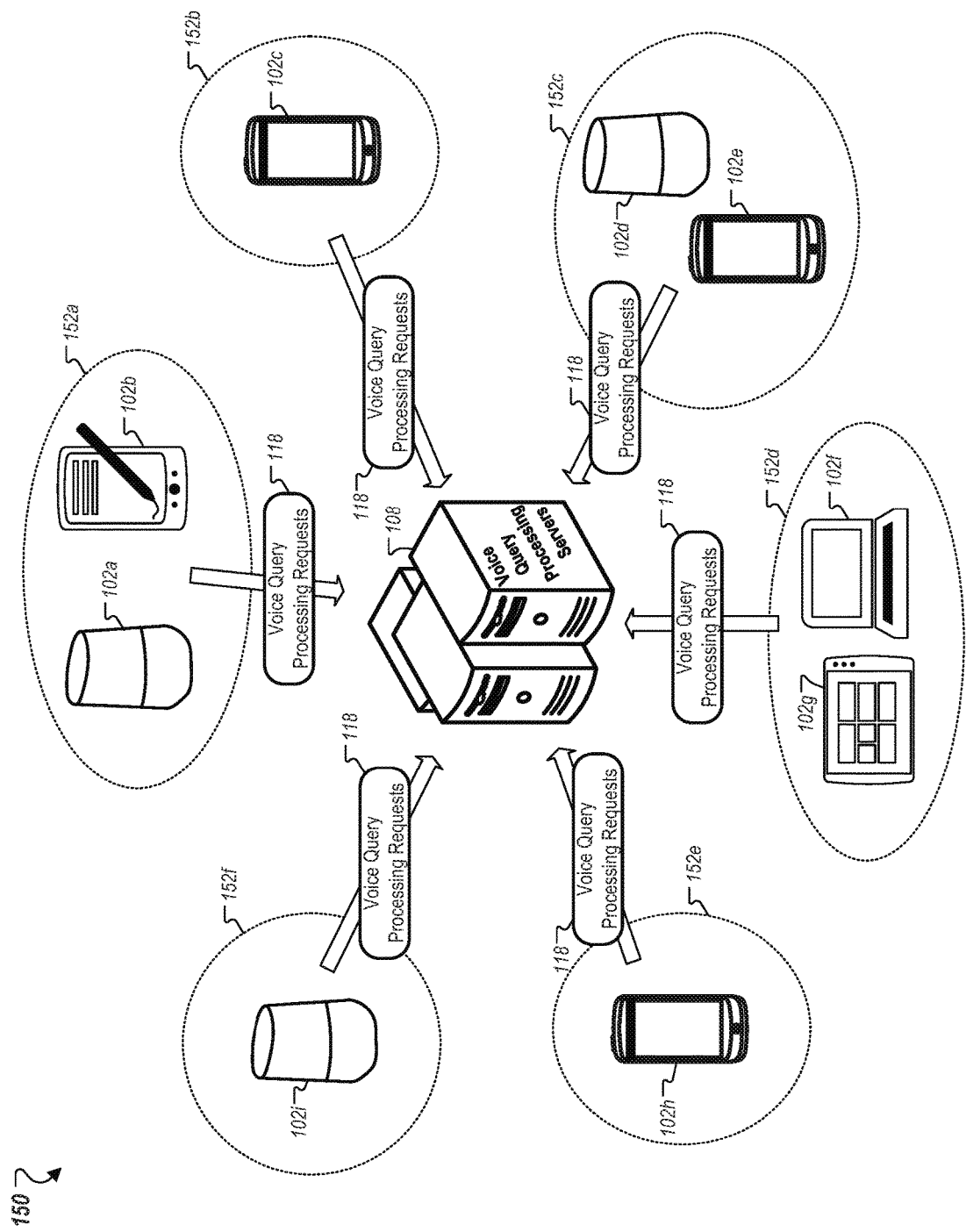
FIG. 1B depicts a conceptual diagram of a voice query processing system in communication with a multiple client devices. The system may analyze traffic from the multiple devices to identify illegitimate voice queries.

FIG. 1B is a conceptual diagram of the voice query processing system 108 in communication with a multiple client devices 102a-i. Although FIG. 1A focused on the interaction between the voice query processing system 108 and a particular client device 102, FIG. 1B shows that the system 108 may interact with many client devices 102a-i concurrently.

Each of the client devices 102a-i sends voice query processing requests 118 to the system 108. In turn, the system 108 may screen the requests 118 with a gatekeeper 110 to classify voice queries identified in the requests 118 as legitimate or not. The system 108 may then either respond to the requests 118 as requested in the voice queries or suppress performance of operations indicated by the voice queries based on whether the queries have been classified as legitimate. Moreover, different ones of the client devices 102*a-i* may be geographically distant from each other and located in different acoustic environments. An acoustic environment defines an area within aural range of a given client device 102 such that the device 102 can detect voice queries uttered at normal audible levels like those spoken by a human (e.g., 60-90 dB). Some environments can have multiple client devices located within them. For example, both client devices 106*a* and 106*b* are located in the same acoustic environment 152*a*. As such, both devices 106*a* and 106*b* may detect the same voice queries spoken within the common environment 152*a*. Other environments, such as environment 152*b*, may include just a single client device 102 that is configured to process voice queries uttered in the environment. In some implementations, the system 108 includes a traffic analyzer 114 that analyzes trends in the traffic of voice query processing requests received from many different client devices over time. If certain conditions in traffic patterns are met, the traffic analyzer 114 may identify voice queries that are common across multiple requests and register all or some of these queries as illegitimate. Future occurrences of the illegitimate voice queries may then be detected and, as a result, the system 108 may suppress performance of operations indicated by the queries.

Figure 2B:
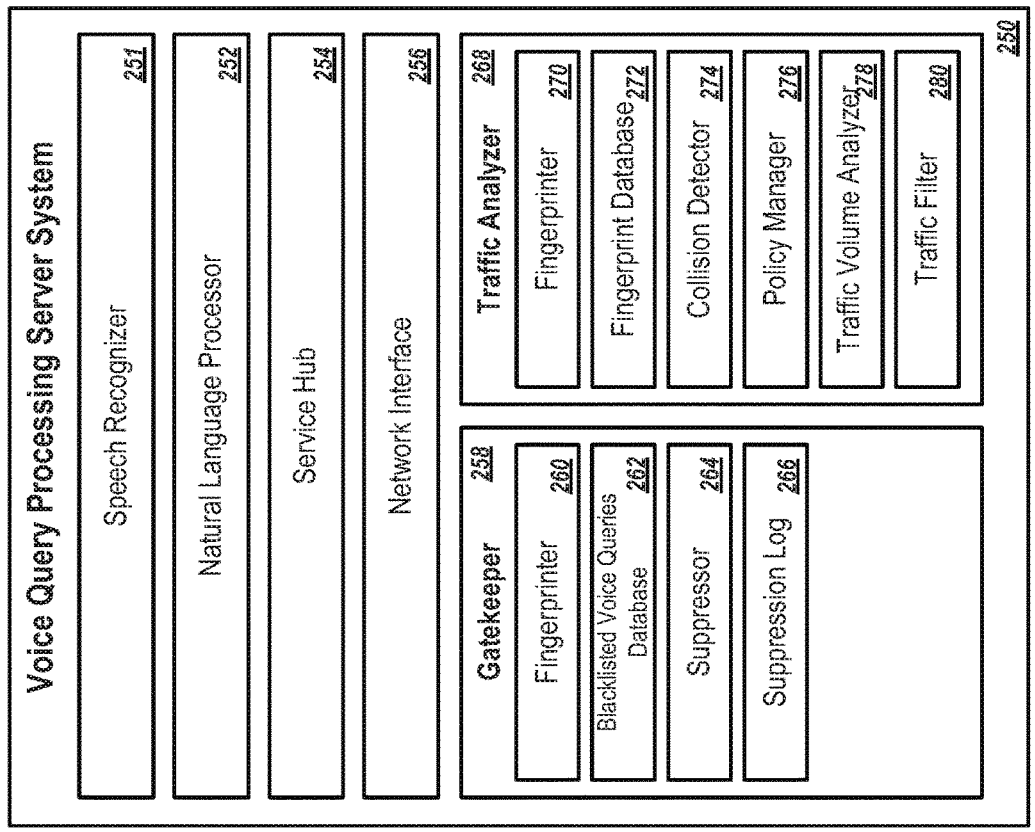
FIG. 2B depicts a block diagram of an example voice query processing server system.
Figure 2A:
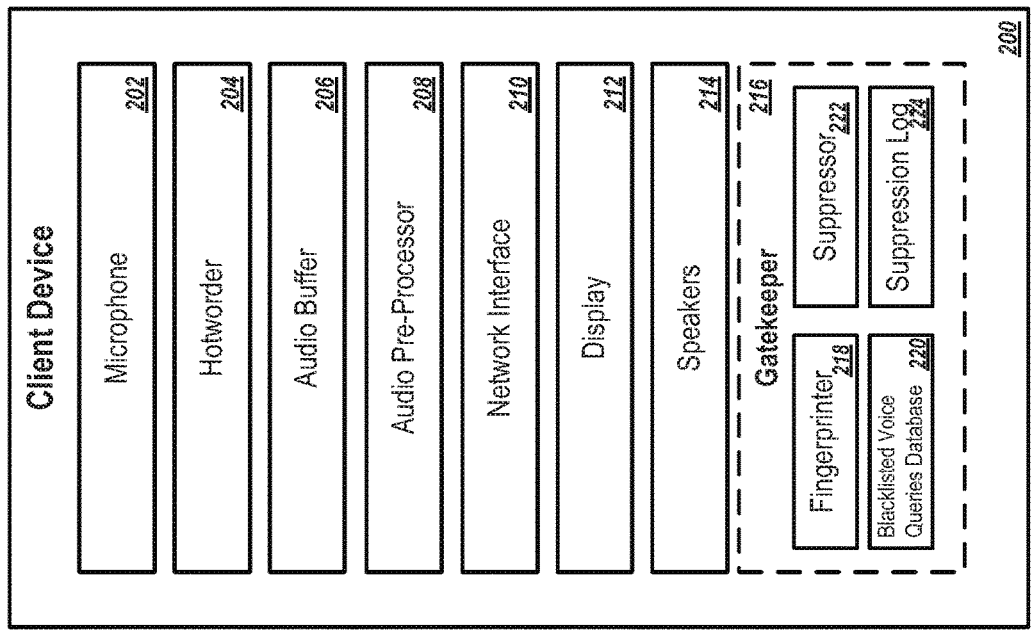
FIG. 2A depicts a block diagram of an example voice-based client device.

Turning to FIGS. 2A and 2B, block diagrams are shown of an example client device 200 and an example voice query processing server system 250. The client device 200 can be a computing device in a local acoustic environment that is configured to detect voice queries uttered in the local environment, and to communicate with the voice query processing server system to obtain responses to the detected voice queries. In some implementations, the client device 200 is configured in a like manner to client device 102 (FIGS. 1A-1B). The voice query processing server system 250 is a system of one or more computers, which may be implemented in one or more locations. The system 250 is configured to perform backend operations on voice query processing requests corresponding to voice queries detected by client devices 200. The system 250 may communicate with one or more client devices 200 over a network such as the Internet. In some implementations, the system 250 is configured in a like manner to system 108 (FIGS. 1A-1B).

The client device 200 can include all or some of the components 202-224. In some implementations, the client device 200 is a voice-based client that primarily relies on speech interactions to receive user inputs and to provide responses to users. For example, the client device 200 may be set in a local environment such as an office, a residential living room, a kitchen, or a vehicle cabin. When powered on, the device 200 may maintain a low-powered default state. In the low-powered state, the device 200 monitors ambient noise in the local environment until a pre-defined activation hotword is detected. In response to detecting the occurrence of an activation hotword, the device 200 transitions from the low-powered state to an active state in which it can receive and process a voice query.

To detect an activation hotword and receive voice queries uttered in a local environment, the device 200 may include one or more microphones 202. The device can record audio signals detected by the microphones 202 and process the audio with a hotworder 204. In some implementations, the hotworder 204 is configured to process audio signals detected in the local environment of the device 200 to identify occurrences of pre-defined hotwords uttered in the local environment. For example, the hotworder 204 may determine if a detected audio signal, or features of the detected audio signal, match a pre-stored audio signal or pre-stored features of an audio signal for a hotword. If a match is determined, the hotworder 204 may provide an indication to a controller to trigger the device 200 to wake-up so that it may capture and process a voice query that follows the detected hotword. In some implementations, the hotworder 204 is configured to identify hotwords in an audio signal by extracting audio features from the audio signal such as filterbank energies or mel-frequency cepstral coefficients. The hotworder 204 may use classifying windows to process these audio features using, for example, a support vector machine, a machine-learned neural network, or other models.

In some implementations, the client device further includes an audio buffer 206 and an audio pre-processor 208. The audio pre-processor 208 receives an analog audio signal from the microphones 202 and converts the analog signal to a digital signal that can be processed by the hotworder 204 or other components of the client device 200. The pre-processor 208 may amplify, filter, and/or crop audio signals to determined lengths. For example, the pre-processor 208 may generate snippets of audio that contain a single voice query and, optionally, a short amount of audio preceding the voice query, a short amount of audio immediately following the voice query, or both. The voice query may or may not include the activation hotword that precedes the substance of the query. In some implementations, the audio-pre-processor 208 can process initial audio data for a voice query to generate a feature representation of a voice query that includes features (e.g., filterbank energies, spectral coefficients). The digital audio data generated by the pre-processor 208 (e.g., a processed digital waveform representation of a voice query or a feature representation of the voice query) can be stored in an audio buffer 206 on the device 200.

The client device 200 can further include an electronic display 212 to present visual information to a user, speakers 214 to present audible information to a user, or both. If the device 200 is a voice-based client that is primarily configured for hands-free user interactions based on voice inputs and speech-based outputs, the device 200 may present responses to user queries using synthesized speech that is played through the speakers 214.

In some instances, the device 200 may receive illegitimate voice queries that are subject to suppression so as to prevent exploitation of user account information, the client device 200, or the voice query processing server system 250. In some implementations, the client device 200 includes a local gatekeeper 216 to screen voice queries detected by the client device 200 and to determine whether to suppress operations associated with certain voice queries. The gatekeeper 216 can include a fingerprinter 218, a database 220 of blacklisted voice queries, a suppressor 222, and a suppression log 224. The fingerprinter 218 is configured to generate an electronic fingerprint for a voice query. The electronic fingerprint is a model or signature of a voice query that identifies distinctive features of the query. The fingerprint can include an audio component that represents acoustic features of the query, a textual component that represents a transcription of the query, or both. Thus, the fingerprint may model both the substance of the query (what was spoken) as well as the manner in which it was spoken, which may vary based on the speaker or other factors.

The gatekeeper 216 may compare a fingerprint for a voice query detected in a local (e.g., acoustic) environment to fingerprints for blacklisted voice queries stored in the database 220. If the gatekeeper 216 determines a match between the fingerprint and one or more of the fingerprints in database 220, an indication may be provided to the suppressor 222. The suppressor 222 suppresses performance of operations associated with voice queries that are determined to be illegitimate. In some implementations, the suppressor 222 may block an operation from being performed in the first instance. For example, if the query "What meetings do I have with Becky today?" is deemed illegitimate, the suppressor 222 may block the system from accessing calendar data to answer the question. In some implementations, the suppressor 222 may reverse an operation that was performed if a query was not immediately identified as being illegitimate, but is later determined to be illegitimate. For example, a change to a user account setting or a financial transaction requested in a voice query may be reversed if the query is determined to be illegitimate after the operation was initially performed.

In some implementations, the gatekeeper 216 maintains a suppression log 224. The suppression log 224 is a data structure stored in memory of the client device 200 that includes data entries representing information about illegitimate voice queries and information about suppressed operations associated with illegitimate voice queries. The device 200 may periodically transmit information from the suppression log 224 to a remote server system, e.g., voice query processing server system 250 for analysis.

The gatekeeper 216 may screen every voice query received at the client device 200 to determine if it is an illegitimate query that corresponds to a blacklisted query. In other implementations, the gatekeeper 216 may select to screen only some voice queries received at the client device 200, rather than all of them. The selection may be random or based on defined filtering criteria (e.g., every nth voice query received, voice queries received during certain times, voice queries received from particular users).

The client device 200 may also include a network interface 210 that enables the device 200 to connect to one or more wired or wireless networks. The device 200 may use the network interface 210 to send messages to, and receive messages from, a remote computing system over a packet-switched network (e.g., the Internet), for example. In some implementations, the client device 200 obtains fingerprints to add to the blacklisted voice queries database 220 from the voice query processing server system 250 over a network. In some implementations, the client device 200 may transmit audio data for received voice queries from the client device 200 to the voice query processing server system 250. The audio data may be transmitted to the system 250 along with requests for the system 250 to process the voice query, including to screen the voice query for legitimacy, and to invoke any operations specified in a validated (legitimate) query.

The voice query processing server system 250, as shown in FIG. 2B, is configured to receive voice query processing requests from one or more client devices, along with audio data for voice queries identified in the requests. The voice query processing system 250 may communicate with the client devices (e.g., client device 200) over one or more networks using a network interface 256. In some implementations, the system 250 is distributed among multiple computers in one or more locations. The system 250 may also include a speech recognizer 251, a natural language processor 252, a service hub 254, a gatekeeper 258, and a traffic analyzer 268, or a combination of all or some of components 251-268.

The server gatekeeper 258 can perform the same or similar operations to those described with respect to the gatekeeper 216 at client device 200. However, unlike the client-side gatekeeper 216, the server gatekeeper 258 may screen voice queries from many devices connected to the system 250. As an example, the fingerprinter 260 may process audio data for a voice query to generate an electronic fingerprint of the voice query. The generated fingerprint can be compared to fingerprints that have been registered with a voice query suppression service. The registered fingerprints are stored in database 262. A suppressor 264 suppresses operations associated with illegitimate voice queries. The gatekeeper 258 may classify a voice query as illegitimate if the electronic fingerprint of the query matches one of the registered fingerprints in database 262. In some implementations, the gatekeeper 258 may require an identical match to classify a voice query as illegitimate. In other implementations, an identical match may not be required. In these implementations, the gatekeeper 258 may allow for a non-zero tolerance to identify matches among fingerprints that are sufficiently similar so as to confidently indicate that the voice queries from which the fingerprints were derived are the same (e.g., common voice queries). For example, if a similarity score representing the similarity between two fingerprints meets a threshold value, the gatekeeper 258 may determine a match between fingerprints. The threshold value represents an acceptable tolerance for the match and may be a fixed value or a dynamic value that changes based on certain parameters. Information about voice queries that have been classified as illegitimate and information about suppressed operations associated with illegitimate voice queries may be stored in suppression log 266.

For voice queries that the gatekeeper 258 validated as being legitimate, the queries may be processed by a speech recognizer 251, natural language processor 252, service hub 254, or a combination of these. The speech recognizer 251 is configured to process audio data for a voice query and generate a textual transcript that identifies a sequence of words included in the voice query. The natural language processor 252 parses the transcription of a voice query to determine an operation requested by the voice query and any parameters in the voice query that indicate how the operation should be performed. For example, the voice query "Call Bob Thomas" includes a request to perform a telephone calling operation and includes a callee parameter indicating that Bob Thomas should be the recipient of the call. Using information about which operation and parameters have been specified in a voice query, as indicated by the natural language processor 252, the service hub 254 may then interact with one or more services to perform the operation and to generate a response to the query. The service hub 254 may be capable of interacting a wide range of services that can perform a range of operations that may be specified in a voice query. Some of the services may be hosted on the voice query processing system 250 itself, while other services may be hosted on external computing systems.

In some implementations, the voice query processing system 250 includes a traffic analyzer 268. The traffic analyzer 268 is configured to aggregate and analyze data traffic (e.g., voice query processing requests) received by the system 250 over time. Based on results of the analysis, the traffic analyzer 268 may identify a portion of the traffic that likely pertains to illegitimate voice queries. The voice queries associated with such traffic may be blacklisted so that subsequent voice queries that match the blacklisted queries are suppressed. In some implementations, the traffic analyzer 268 may identify an illegitimate voice query without supervision and without a priori knowledge of the voice query. In these and other implementations, the traffic analyzer 268 may further identify an illegitimate voice query without identifying a pre-defined watermark in the voice query that is intended to signal that operations associated with the voice query should be suppressed (e.g., a television commercial that includes a watermark to prevent triggering voice-based client devices in audible range of the devices when an activation hotword is spoken in the commercial).

The traffic analyzer 268 may include all or some of the components 270-280 shown in FIG. 2B. The fingerprinter 270 is configured to generate an electronic fingerprint of a voice query, e.g., like fingerprinters 218 and 260 in gatekeepers 216 and 268, respectively. The fingerprint database 272 stores fingerprints for voice queries that the system 250 has received over a period of time. The collision detector 274 is configured to identify a number of collisions or matches between fingerprints in the fingerprint data base 272. In some implementations, the collision detector 274 is configured to blacklist a voice query represented by a group of matching fingerprints in the fingerprint database 272 based on a size of the group. Thus, if the traffic analyzer 268 identifies that a common voice query appears in requests received by the system 250 with sufficient frequency over time, as indicated by the size of the matching group of fingerprints, then the common voice query may be blacklisted, e.g., by adding a fingerprint of the voice query to database 262 and/or database 220.

In some implementations, traffic volume analyzer 278 monitors a volume of traffic received at the system 250 over time. The analyzed traffic may be global or may be only a portion of traffic that the traffic filter 280 has filtered based on criteria such as the geographic locations of users or client devices that submitted the voice queries, the models of client devices that submitted the voice queries, profile information of users that submitted the queries, or a combination of these and other criteria. If the volume of requests that the system 250 receives in a given time interval is sufficiently high (e.g., meets a threshold volume), the volume analyzer 278 may trigger the collision detector 274 to search for illegitimate voice queries in the received traffic. In some implementations, the collision detector 274 may identify an illegitimate voice query from a set of traffic based on identifying that a common voice query occurs in a significant portion of the traffic. For example, if a threshold number of voice query processing requests from various client devices, or a threshold portion of the requests in a sample set of traffic, are determined to include the same voice query, the analyzer 268 may blacklist the voice query and register its electronic fingerprint with a gatekeeper 216 or 258 (e.g., a voice query suppression service).

In some implementations, a policy manager 276 manages the criteria by which the traffic analyzer 268 determines to filter traffic, trigger searches for illegitimate voice queries, and blacklist common voice queries. In some implementations, the policy manager 276 can expose an application programming interface ("API") or provide a dashboard or other interface for a system administrator to view and adjust these policies.

Figure 3:
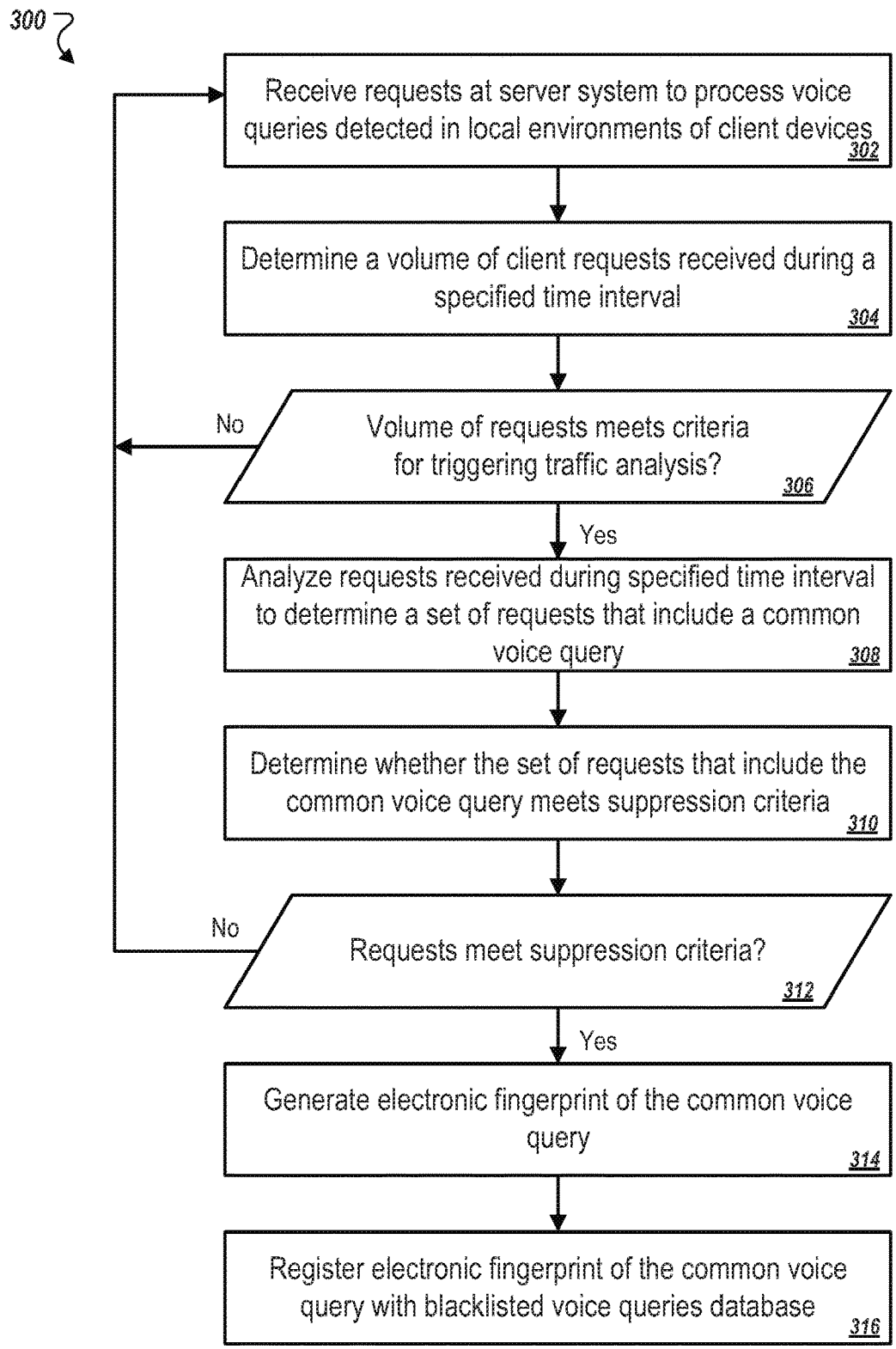
FIG. 3 is a flowchart of an example process for analyzing traffic at a voice query processing system to identify an illegitimate voice query based on a volume of traffic experienced by the system over time.

FIG. 3 is a flowchart of an example process 300 for analyzing traffic at a voice query processing system to identify an illegitimate voice query based on a volume of traffic experienced by the system over time. The process 300 may be carried out by a voice query processing server system, e.g., voice query processing server system 108 or 250. The voice query processing server system may have a traffic analyzer, e.g., traffic analyzer 268, to analyze voice query processing requests received by the system over time and detect illegitimate voice queries indicated by such requests.

At stage 302, the voice query processing system receives requests from client devices to process voice queries that were detected by the client devices in their local environments. In some implementations, the system communicates with many client devices (e.g., tens, hundreds, thousands, or millions) over one or more networks, and therefore receives many voice query processing requests. A voice query processing request typically identifies a single voice query that the system is requested to process, although in some implementations a query may identify multiple voice queries. The voice query processing system may process a voice query by transcribing the voice query to text and performing an operation indicated by the content of the query. Further, the system may transmit to a client device a response to a voice query, which may be a confirmation that an operation was performed successfully, an indication that a requested operation has been suppressed, or an answer to a question, for instance. In some implementations, audio data (e.g., a compressed waveform or audio features) for a voice query is explicitly embedded within a voice query processing request. In some implementations, the audio data for a voice query can be transmitted to the server system in one or more messages separate from the request itself, but the request references the messages that provide the audio data. In some implementations, a voice query processing request may include a pointer or other address indicating a network storage location that the server system can access a copy of audio data for the voice query at issue.

At stage 304, the system determines a volume of client requests (e.g., traffic) received over time. This stage may be performed, for example, by traffic volume analyzer 278. The volume of received requests can be determined with respect to a defined window of time. In some implementations, the system determines the volume of client requests received during a most recent period of time (e.g., a number of requests received in the past 30 seconds, 1 minute, 2 minutes, 5 minutes, 15 minutes, 30 minutes, 1 hour, 4 hours, 12 hours, 24 hours, or 1 week). The time interval may be pre-defined and may be a static or dynamic parameter that can be set automatically or based upon user input. The volume of received requests represents a value that is based upon a total number of requests received by the system during the specified time interval. In a first example, the volume indicates an absolute number of requests received by the system during a specified time interval. In a second example, the volume indicates a relative number of requests received by the system during a specified time interval. In a third example, the volume indicates a rate of change in the number of requests received by the system during a specified time interval. In a fourth example, the volume indicates an acceleration in the number of requests received by the system during a specified time interval. In a fourth example, the volume is a value that is based upon a combination of factors such as two or more of an absolute number, a relative number, a rate of change, and an acceleration in the number of requests received by the system during a specified time interval.

In some implementations, the system determines the volume of requests received by the system globally over time (e.g., counts substantially all requests received by the system during a specified time interval without filtering the requests). In other implementations, the system determines the volume of requests only with respect to requests having characteristics that meet certain criteria. For example, the system may determine a volume of requests received from client devices having a limited set of internet protocol (IP) addresses, from client devices or users that are located in particular geographic regions, or from particular models of client devices.

At stage 306, the system determines whether the volume of requests received by the system over time, as determined at stage 304, meets one or more criteria for triggering a deep-dive traffic analysis. Stage 306 may be performed by a traffic volume analyzer 178, for example. During a deep-dive traffic analysis, the system analyzes voice query processing requests received over a period of time in search of any illegitimate voice queries that should be blacklisted. In some implementations, the determining whether the volume of requests meets criteria for triggering a deep-dive traffic analysis includes comparing the volume of requests received during a particular time interval to a threshold value. For example, if the volume of requests indicates an absolute number of requests received by the system during a specified time interval, then the system may compare the absolute number of requests received to a threshold number of requests. If a traffic spike is indicated because the actual number of requests received exceeds the threshold, the system may proceed to a deep-dive traffic analysis at stage 308. If the volume of requests indicates a rate of change in the number of requests received by the system over time, the system may compare the observed rate of change to a threshold rate to determine whether to perform a deep-dive traffic analysis. If the criteria for triggering a deep-dive analysis is not satisfied, the process 300 may end or return to stage 302 in some implementations.

At stage 308, the system performs a deep-dive analysis of received requests to determine if the requests include any illegitimate voice queries that are not currently blacklisted. This stage 308 can be performed by a fingerprinter 270, collision detector 274, and traffic volume analyzer 278 in some implementations. If, for example, a malicious entity has launched a distributed campaign against the voice query processing system 250 (e.g., a distributed denial of service (DDOS) attack), the system may be flooded within a short time span with requests to process many instances of the same or similar voice query. For instance, a video broadcasted on television or over a computer network may be played, where the video is designed to trigger many voice-based clients in audible range of the played video to generate voice query processing requests containing a voice query uttered in the video. In some implementations, one objective of the system at stage 308 is to identify a common voice query that occurs within a significant number of requests received from client devices over a period of time. Because utterances for voice queries from legitimate users are typically distinctive, e.g., based on the unique voice patterns and speech characteristics of individual speakers, the system may classify a common voice query that occurs in many voice query processing requests from disparate client devices over time as illegitimate. For example, if the volume (e.g., quantity) of voice queries indicated by a set of requests received at the server system is at least a threshold volume, the system may then flag the voice query as illegitimate. In some implementations, the volume of common voice queries can be determined based on a count of a number of voice queries whose electronic fingerprints match each other, a number of voice queries whose text transcriptions match each other, or a combination of these. The volume may be an absolute count of the number of voice queries in a group of voice queries having matching electronic fingerprints and/or transcriptions, a relative count, a rate of change in counts over time, an acceleration of counts over time, or a combination of these. In some implementations, the analysis in stage 308 is limited to voice query processing requests received over a limited time interval. The time interval may be the same or different from the time interval applied in stage 304. In other implementations, the analysis in stage 308 is not limited to voice query processing requests received over a specific time interval. For example, a video on an online video streaming service may be played a number of times by different users, even if not within a short time span. The system may detect common occurrences of a voice query in the video over time and determine that the voice query is not an actual user's voice, but is rather a feature of a reproducible media. Accordingly, the voice query may be deemed illegitimate and blacklisted.

At stage 310, the system determines whether a set of requests that request processing of a common voice query meets one or more suppression criteria. The suppression criteria can include a volume of requests associated with the common voice criteria, characteristics of the common voice query (e.g., whether the query includes blacklisted terms), and/or additional criteria. For example, the system may classify as illegitimate a voice query that is common among a set of requests if it determines that the size of the set (e.g., the volume or quantity of requests in the set) meets a threshold size, thereby indicating for example that the common voice query occurs with sufficient frequency in received traffic.

In some implementations, signals in addition to or alternatively to the size of the set (e.g., a volume or count of the number of requests in the set having matching fingerprints for a common voice query) can be applied in determining whether the set of requests meets suppression criteria. These signals can include information about user feedback to a response to the voice query or to an operation performed as requested in the voice query. The system may obtain data that indicates whether a user accepted, rejected, or modified a response to a voice query. Depending on the distribution of users that accepted, rejected or modified responses or the results of operations performed as requested in respective instances of a common voice query, the system may bias its determination as to whether the voice query should be blacklisted or whether the set of requests meets prescribed suppression criteria. For example, if the system receives a large number of requests that each includes the voice query "What's the traffic like today between home and the park?", the system may prompt users to confirm that they would like to obtain a response to this question. As more users confirm that the system accurately received the voice query and confirm that they desire to obtain a response to the question, the system may be influenced as less likely that the voice query is illegitimate (and less likely to meet the suppression criteria). In contrast, as more users cancel or modify the query in response to the prompt, the system may be influenced as more likely to classify the voice query as illegitimate (and more likely to meet the suppression criteria).

At stage 312, the system selects a path in the process 300 based on whether the set of requests for the common voice query meets the suppression criteria. If the suppression criteria is met, the process 300 can advance to stage 314. If the suppression criteria is not met, the process may, for example, return to stage 302. In some implementations, the suppression criteria is a null set. That is, any set of requests that identify a common voice query may be classified as illegitimate regardless of whether the set meets additional criteria.

At stage 314, a fingerprinter, e.g., fingerprinter 270, generates an electronic fingerprint to model the common voice query that occurs in a set of requests. The fingerprinter may generate an electronic fingerprint from audio data for the voice query, a textual transcription of the voice query, or both. In some implementations, the fingerprint is derived from a representative instance of the common voice query selected from among the set of voice queries identified by the set of requests. The representative instance of the common voice query may be selected in any suitable manner, e.g., by selecting an instance of the common voice query having a highest audio quality or by selecting the representative instance at random. In some implementations, the fingerprint is derived from multiple representative instances of the common voice query or from all of the common voice queries identified by the set of requests. For example, the audio data from multiple instances of the common voice query may be merged before generating a fingerprint. Alternatively, intermediate fingerprints may be generated for each instance, and the intermediate fingerprints then merged to form a final electronic fingerprint for the common voice query.

At stage 316, the system's traffic analyzer registers the electronic fingerprint of the common voice query with a gatekeeper. In some implementations, registering the fingerprint includes adding the fingerprint to a database of voice queries, e.g., database 262, which the gatekeeper checks new voice queries against to determine whether to suppress requested operations indicated by the new voice queries. In some implementations, a voice query may be blacklisted for only a subset of client devices which interact with the system, rather than being universally blacklisted. For example, if the system identifies that an illegitimate voice query is originating from a devices in a particular geographic region, the system may blacklist the voice query only with respect to client devices or users located in that region. In some implementations, the system may also attach temporal constraints to a blacklisted voice query. For example, a voice query may be blacklisted either in perpetuity (no expiration) or temporarily. After a voice query is removed from the blacklist, new instances of the voice query may not be subject to suppression. Temporal constraints, geographic constraints, and other rules that govern how a voice query is blacklisted can be registered along with the fingerprint for the voice query in a database of a gatekeeper. In some implementations where the client devices perform voice query screening locally, the server system can push updates to the client devices to keep the devices' local blacklist databases current. For example, a fingerprint for a voice query that the traffic analyzer at the server system has recently classified as illegitimate may be transmitted to multiple client devices. In some implementations, the system may push a fingerprint for a blacklisted voice query to all client devices without restriction. In other implementations, the system may push a fingerprint for a blacklisted voice query only to client devices that are covered by the blacklist, e.g., devices within a particular geographic region.

Figure 4:
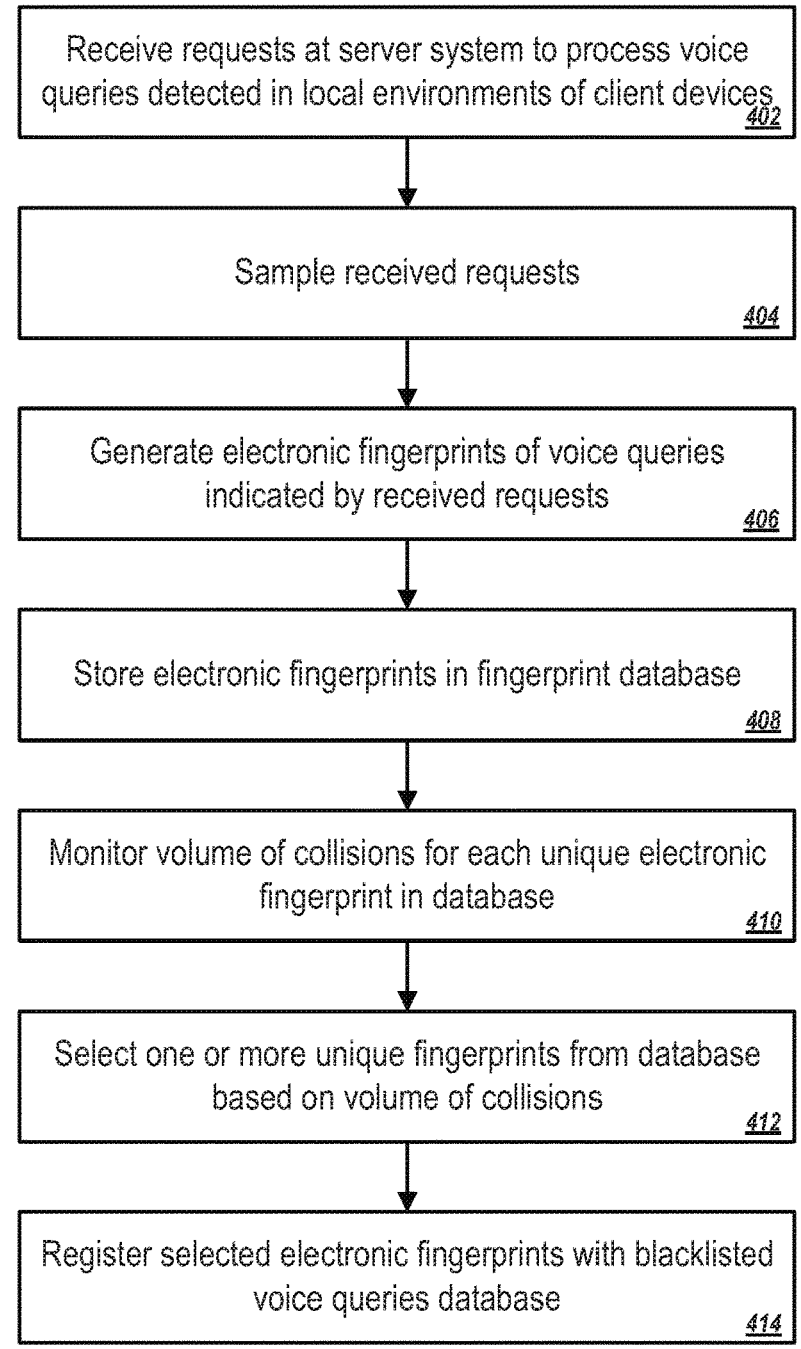
FIG. 4 is a flowchart of an example process for analyzing traffic at a voice query processing system to identify an illegitimate voice query based on the frequency that a common voice query occurs in the traffic over time.

FIG. 4 is a flowchart of an example process 400 for analyzing traffic at a voice query processing system to identify an illegitimate voice query based on the frequency that a common voice query occurs in the traffic over time. The process 400 may be carried out by a voice query processing system, e.g., systems 108 or 250. In some implementations, the process 400 is carried out at least in part by a traffic analyzer at a server system, e.g., traffic analyzer 268.

At stage 402, the voice query processing system receives requests from client devices to process voice queries that were detected by the client devices in their local environments. In some implementations, the system communicates with many client devices (e.g., tens, hundreds, thousands, or millions) over one or more networks, and therefore receives many voice query processing requests. A voice query processing request typically identifies a single voice query that the system is requested to process, although in some implementations a query may identify multiple voice queries. The voice query processing system may process a voice query by transcribing the voice query to text and performing an operation indicated by the content of the query. Further, the system may transmit to a client device a response to a voice query, which may be a confirmation that an operation was performed successfully, an indication that a requested operation has been suppressed, or an answer to a question, for instance. In some implementations, audio data (e.g., a compressed waveform or audio features) for a voice query is explicitly embedded within a voice query processing request. In some implementations, the audio data for a voice query can be transmitted to the server system in one or more messages separate from the request itself, but the request references the messages that provide the audio data. In some implementations, a voice query processing request may include a pointer or other address indicating a network storage location that the server system can access a copy of audio data for the voice query at issue.

At stages 406-410, the system performs various operations on voice queries that correspond to a set of voice query processing requests. In some implementations, the operations are performed on voice queries corresponding to substantially all voice queries received by the system over a period of time. In other implementations, the system may sample the received requests and perform stages 406-410 on voice queries corresponding to only a selected (sampled) subset of the voice queries received by the system over a period of time. In these implementations, the system samples received voice query processing requests at stage 404. Requests may be sampled according to one or more criteria such as the time the requests were transmitted by the client devices or received by the server system, the location or geographic region of client devices or users that submitted the requests, or a combination of these or other factors.

At stage 406, a fingerprinter generates electronic fingerprints for voice queries identified in the requests received from the client devices. In some implementations, fingerprints are generated only for the voice queries that correspond to requests that were selected in the sample set from stage 404. At stage 408, the fingerprints for the voice queries are added to a database such as fingerprint database 172. The fingerprint database can include a cache of electronic fingerprints for voice queries received by the system over a recent period of time (e.g., last 10 seconds, 30 seconds, 1 minute, 2, minutes, 5 minutes, 15 minutes, 30 minutes, 1 hour, 4 hours, 1 day, or 1 week).

At stage 410, a collision detector of the voice query processing system, e.g., collision detector 274, monitors a volume of collisions among fingerprints for each unique voice query represented in the fingerprint database. A collision occurs each time a fingerprint for a new voice query is added to the database that matches a previously stored fingerprint in the database. Generally, a collision indicates that a new instance of a previously detected voice query has been identified. In some implementations, each group of matching fingerprints within the database represent a same or similar voice query that is different from the voice queries represented by other groups of matching fingerprints in the database. That is, each group of matching fingerprints represents a unique voice query that was common among a set of processing requests. The collision detector may constantly monitor a volume of collisions in the fingerprint database for each unique voice query. In some implementations, the volume of collisions for a given voice query is determined based on a count of a number of matching fingerprints in a group detected by the system over time. The volume of collisions may indicate, for example, an absolute number of collisions, a relative number of collisions, a rate of change in collisions over time, an acceleration of collisions over time, or a combination of two or more of these.

At stage 412, the system determines whether to classify one or more of the unique voice queries represented in the fingerprint database as illegitimate voice queries. A voice query may be deemed illegitimate based on the volume of collisions detected for the voice query over a recent period of time. For example, the system may determine to blacklist a voice query if the volume of collisions detected for the voice query over a recent period of time meets a threshold volume of collisions. The collision detector may keep track of groups of matching fingerprints in the fingerprint database and counts of the number of matching fingerprints in each group. Being as the groups are sorted based on having matching fingerprints, each group can represent a different voice query (e.g., a same voice query or sufficiently similar voice queries). The system can select to classify voice queries corresponding to one or more of the groups based on the counts of the number of matching fingerprints in each group. For example, voice queries for groups having the top-n (e.g., n=1, 2, 3, 4, 5, or more) highest counts may be selected and classified as illegitimate, and/or voice queries for groups having counts that meet a threshold count may be classified as illegitimate.

In some implementations, signals in addition to or alternatively to the volume of collisions (e.g, values based on counts of matching fingerprints per group) can be applied in determining whether to classify a voice query as illegitimate and to blacklist the voice query. These signals can include information about user feedback to a response to the voice query or to an operation performed as requested in the voice query. The system may obtain data that indicates whether a user accepted, rejected, or modified a response to a voice query. Depending on the distribution of users that accepted, rejected or modified responses or the results of operations performed as requested in respective instances of a common voice query, the system may bias its determination as to whether the voice query should be blacklisted or whether the set of requests meets prescribed suppression criteria. For example, if the system receives a large number of requests that each includes the voice query "What's the traffic like today between home and the park?", the system may prompt users to confirm that they would like to obtain a response to this question. As more users confirm that the system accurately received the voice query and confirm that they desire to obtain a response to the question, the system may be influenced as less likely that the voice query is illegitimate (and less likely to meet the suppression criteria). In contrast, as more users cancel or modify the query in response to the prompt, the system may be influenced as more likely to classify the voice query as illegitimate (and more likely to meet the suppression criteria).

At stage 414, the system then blacklists an illegitimate voice query by registering a fingerprint for the voice query with gatekeepers at the server system and/or the client devices. In some implementations, the system registers a fingerprint with a gatekeeper (e.g., a voice query suppression service) in a similar manner to that described at stage 316 of FIG. 3.

Figure 5:
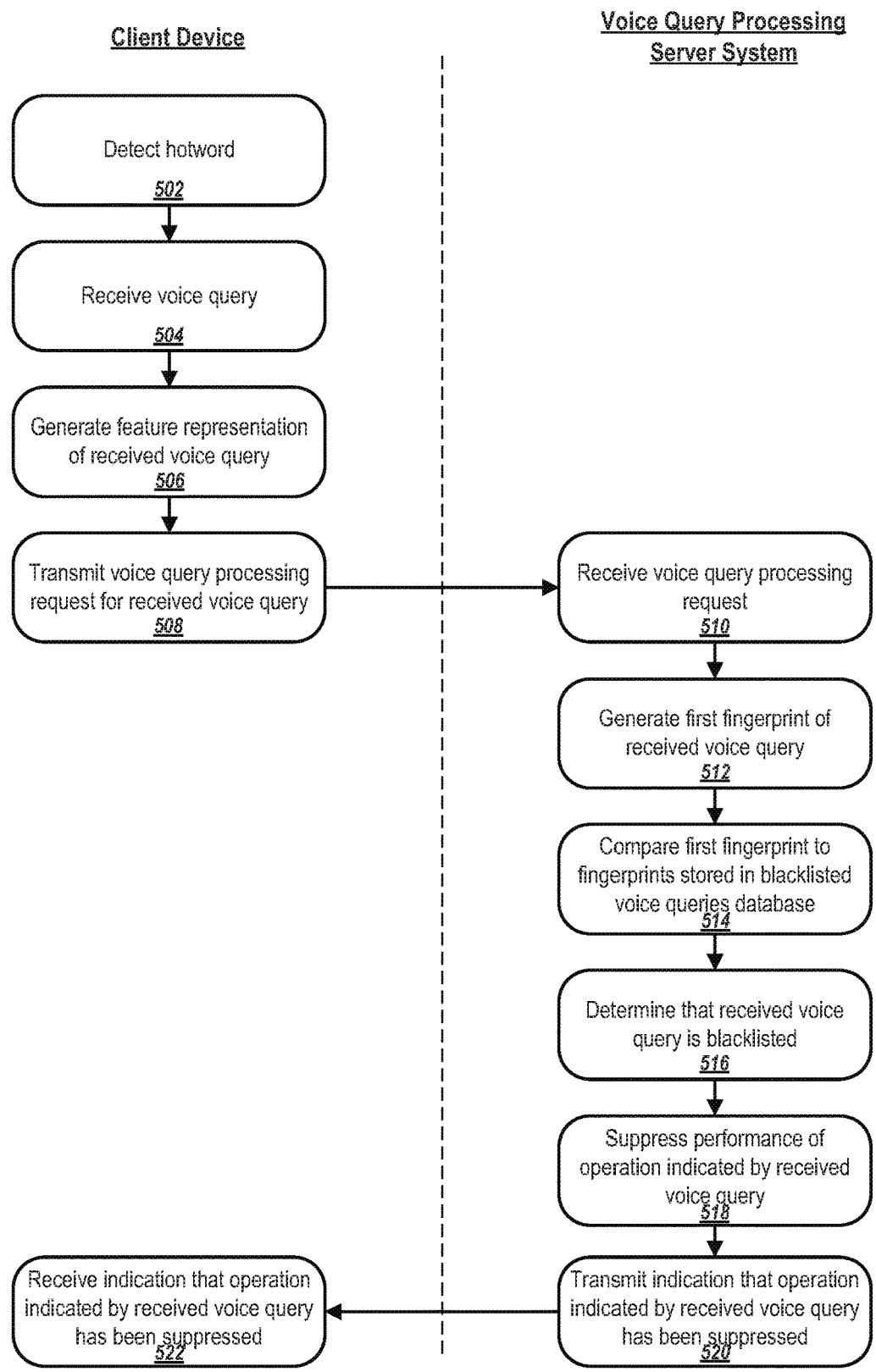
FIG. 5 is a swim-lane diagram illustrating an example process for detecting an illegitimate voice query and suppressing a voice query operation at a server system.

FIG. 5 is a swim-lane diagram illustrating an example process 500 for detecting an illegitimate voice query and suppressing a voice query operation at a server system. In some implementations, the process 500 is performed between a client device, e.g., client 106 or 200, and a voice query processing server system, e.g., system 108 or 250. At stage 502, the client device detects a hotword in its local environment. In response to detecting the hotword, the device activates and at stage 504 captures a voice query that includes a series of words following the hotword. At stage 506, the client device pre-processes audio data for the received voice query. Optionally, pre-processing can include generating a feature representation of an audio signal for the received voice query. At stage 508, the client device generates and transmits a voice query processing request for the voice query to the server system. The server system receives the request at stage 510. Upon receiving the request, the server system generates an electronic fingerprint of the voice query. The electronic fingerprint is compared to other fingerprints that are pre-stored in a database of blacklisted voice queries at stage 514. If the fingerprint for the received voice query matches any of the pre-stored fingerprints corresponding to a blacklisted voice query, then the system determines that the received voice query has been blacklisted and suppresses performance of an operation indicated by the received voice query (stage 518). In some implementations, the server system may transmit an indication to the client device that the operation indicated by the received voice query has been suppressed (stage 520). The client device receives the indication at stage 522. The client may log the indication of a suppressed voice query and may generate a user notification about the suppressed operation.

Figure 6:
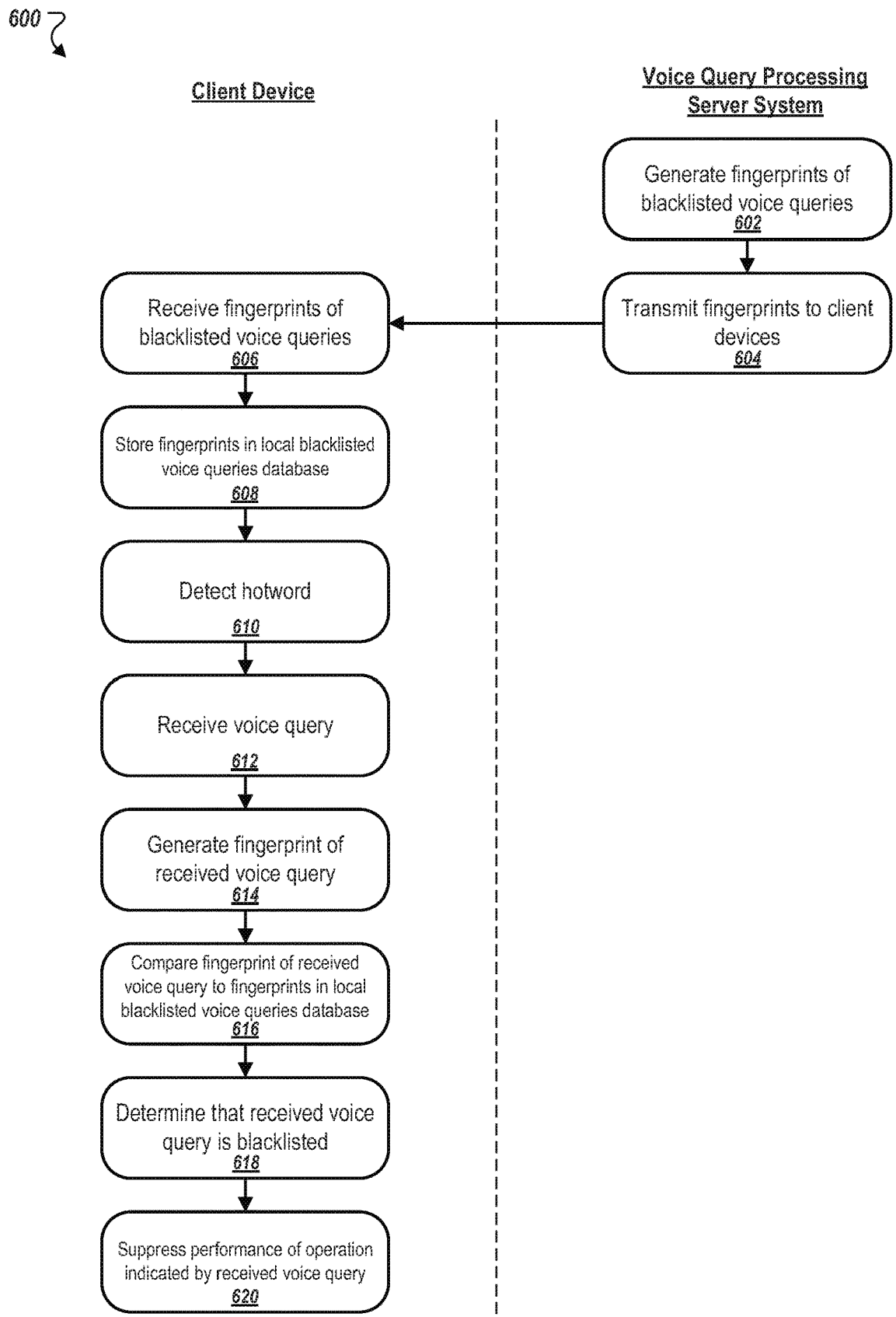
FIG. 6 is a swim-lane diagram illustrating an example process for detecting an illegitimate voice query and suppressing a voice query operation at a client device.

FIG. 6 is a swim-lane diagram illustrating an example process 600 for detecting an illegitimate voice query and suppressing a voice query operation at a client device. In some implementations, the process 600 is performed between a client device, e.g., client 106 or 200, and a voice query processing server system, e.g., system 108 or 250. In contrast to the process 500 of FIG. 5, the process 600 of FIG. 6 screens voice queries locally at the client device rather than at the server system. Nonetheless, the client device may obtain the model electronic fingerprints for blacklisted voice queries from a server system. The fingerprints for blacklisted voice queries may be generated by the server system in some implementations using the techniques described with respect to FIGS. 3 and 4.

At stage 602, the server system generates fingerprints of blacklisted voice queries. At stage 604, the server system transmits registers the fingerprints for the blacklisted voice queries including transmitting the fingerprints to a client device that has a local gatekeeper fro screening voice queries. At stage 606, the client device receives the model fingerprints for the blacklisted voice queries from the server system. At stage 608, the client device stores the fingerprints in a local blacklisted voice queries database. At stage 610, the client device detects an utterance of a hotword in the local environment of the device. In response to detecting the hotword, the client device activates and captures a voice query that includes one or more words following the hotword (stage 612). At stage 614, the device generates an electronic fingerprint of the received voice query. The electronic fingerprint is compared to other fingerprints that are pre-stored in a database of blacklisted voice queries at stage 616. If the fingerprint for the received voice query matches any of the pre-stored fingerprints corresponding to a blacklisted voice query (stage 618), then the device determines that the received voice query has been blacklisted and suppresses performance of an operation indicated by the received voice query (stage 620).

Figure 7:
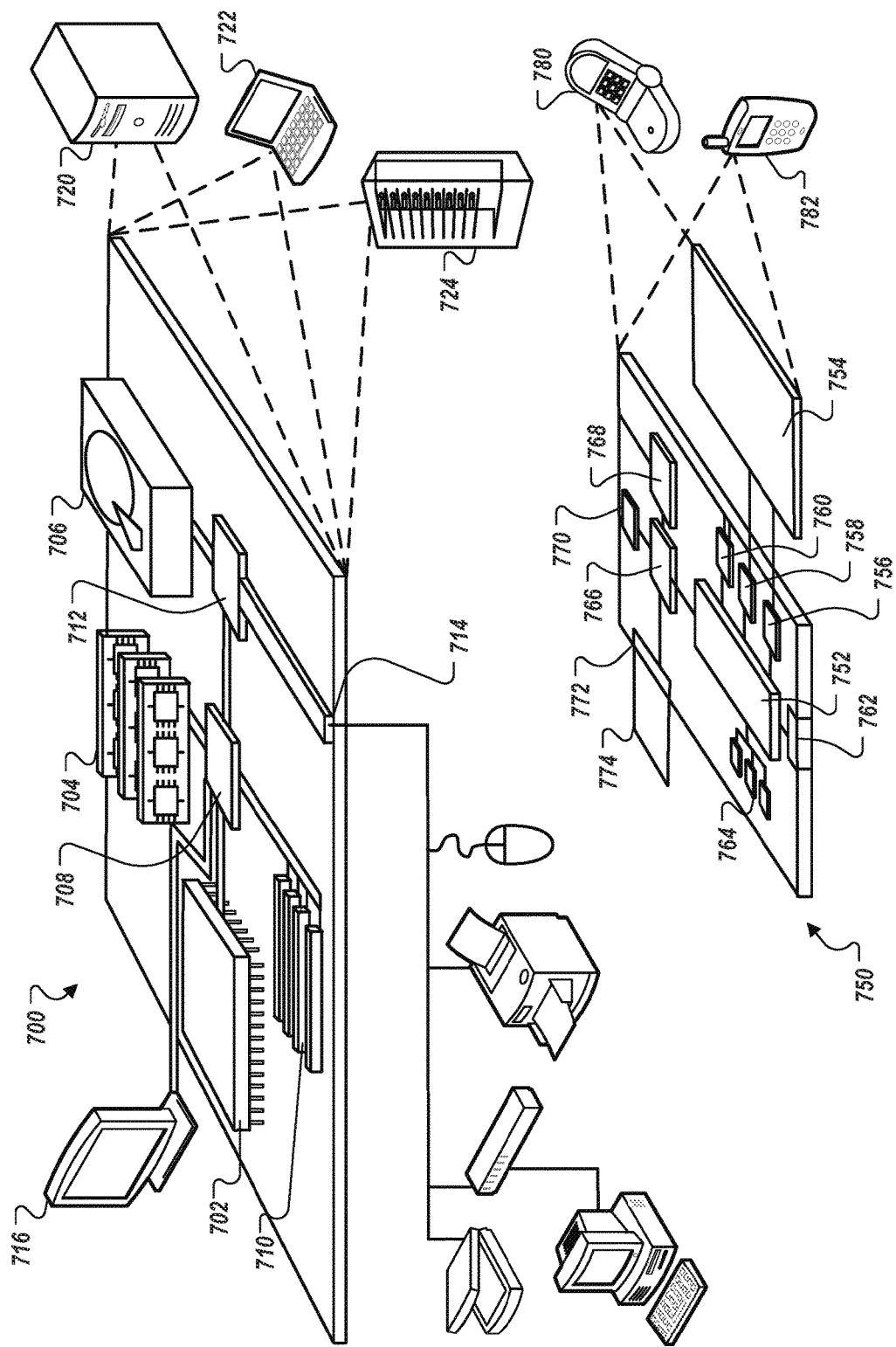
FIG. 7 depicts an example computing device and mobile computing device that may be applied to implement the computer-implemented methods and other techniques disclosed herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
  receiving, at data processing hardware of a voice query processing server system, a plurality of voice query processing requests during a specified time interval, each voice query processing request comprising audio data and referencing a respective voice query;
  in response to receiving the plurality of voice query processing requests during the specified time interval:
    for each voice query processing request in at least a subset of the plurality of voice query processing requests received during the specified time interval, processing, by the data processing hardware, the audio data of the voice query processing request to generate an acoustic fingerprint for the respective voice query referenced by the voice query processing request; and
    identifying, by the data processing hardware, a group of voice query processing requests that each reference a common voice query by determining matches among the acoustic fingerprints generated for each voice query processing request in at least the subset of the plurality of voice query processing requests; and
  suppressing, by the data processing hardware, performance of operations indicated by the common voice query.

2. The method of claim 1, wherein receiving the plurality of voice query processing requests during the specified time interval comprises receiving each of the plurality of voice query processing requests from a respective disparate client device.

3. The method of claim 2, wherein each of the plurality of voice query processing requests comprises a hotword configured to activate the respective disparate client device and one or more words following the hotword.

4. The method of claim 1, wherein the audio data of each voice query processing request comprises audio data for content of the respective voice query referenced by the voice query processing request.

5. The method of claim 1, wherein the audio data of each voice query processing request comprises audio features for an activation hotword that precedes content of the respective voice query referenced by the voice query processing request.

6. The method of claim 1, wherein the common voice query referenced by each voice query processing request in the identified group of voice query processing requests is broadcasted from one or more speakers of a respective audio device.

7. The method of claim 6, wherein the respective audio device comprises a television, a multimedia center, a radio, a mobile computing device, a desktop computer, or a wearable computing device.

8. The method of claim 1, wherein the plurality of voice query processing requests are received simultaneously.

9. The method of claim 1, wherein the voice query processing server system is in communication with a plurality of client devices via a network, each client device located in a respective acoustic environment and configured to capture voice queries spoken within the respective acoustic environment and send the captured voice queries over the network to the voice query processing server system.

10. The method of claim 1, further comprising, prior to suppressing performance and operations of the common voice query, determining that a count that indicates a number of the voice query processing requests in the identified group of voice query processing requests that each reference the common voice query satisfies a threshold count.

11. The method of claim 1, further comprising, registering a respective acoustic fingerprint for the common voice query to a database of blacklisted voice queries, the respective acoustic fingerprint based on one or more of the acoustic fingerprints generated for each voice query processing request in the identified group of voice query processing requests that each reference the common voice query.

12. The method of claim 1, wherein suppressing performance of operations indicated by the common voice query comprises suppressing performance of operations indicated by the common voice query in one or more voice query processing requests subsequently received at the data processing hardware.

13. A voice query processing server system comprising:
  data processing hardware; and
  memory hardware in communication with the data processing hardware and storing instructions that when executed on the data processing hardware cause the data processing hardware to perform operations comprising:
    receiving a plurality of voice query processing requests during a specified time interval, each voice query processing request comprising audio data and referencing a respective voice query;
    in response to receiving the plurality of voice query processing requests during the specified time interval:
      for each voice query processing request in at least a subset of the plurality of voice query processing requests received during the specified time interval, processing the audio data of the voice query processing request to generate an acoustic fingerprint for the respective voice query referenced by the voice query processing request; and
      identifying a group of voice query processing requests that each reference a common voice query by determining matches among the acoustic fingerprints generated for each voice query processing request in at least the subset of the plurality of voice query processing requests; and
    suppressing performance of operations indicated by the common voice query.

14. The voice query processing server system of claim 13, wherein receiving the plurality of voice query processing requests during the specified time interval comprises receiving each of the plurality of voice query processing requests from a respective disparate client device.

15. The voice query processing server system of claim 14, wherein each of the plurality of voice query processing requests comprises a hotword configured to activate the respective disparate client device and one or more words following the hotword.

16. The voice query processing server system of claim 13, wherein the audio data of each voice query processing request comprises audio data for content of the respective voice query referenced by the voice query processing request.

17. The voice query processing server system of claim 13, wherein the audio data of each voice query processing request comprises audio features for an activation hotword that precedes content of the respective voice query referenced by the voice query processing request.

18. The voice query processing server system of claim 13, wherein the common voice query referenced by each voice query processing request in the identified group of voice query processing requests is broadcasted from one or more speakers of a respective audio device.

19. The voice query processing server system of claim 18, wherein the respective audio device comprises a television, a multimedia center, a radio, a mobile computing device, a desktop computer, or a wearable computing device.

20. The voice query processing server system of claim 13, wherein the plurality of voice query processing requests are received simultaneously.

21. The voice query processing server system of claim 13, wherein the voice query processing server system is in communication with a plurality of client devices via a network, each client device located in a respective acoustic environment and configured to capture voice queries spoken within the respective acoustic environment and send the captured voice queries over the network to the voice query processing server system.

22. The voice query processing server system of claim 13, wherein the operations further comprise, prior to suppressing performance and operations of the common voice query, determining that a count that indicates a number of the voice query processing requests in the identified group of voice query processing requests that each reference the common voice query satisfies a threshold count.

23. The voice query processing server system of claim 13, wherein the operations further comprise, registering a respective acoustic fingerprint for the common voice query to a database of blacklisted voice queries, the respective acoustic fingerprint based on one or more of the acoustic fingerprints generated for each voice query processing request in the identified group of voice query processing requests that each reference the common voice query.

24. The voice query processing server system of claim 13, wherein suppressing performance of operations indicated by the common voice query comprises suppressing performance of operations indicated by the common voice query in one or more voice query processing requests subsequently received at the data processing hardware.

* * * * *